United States Patent
Li et al.

(10) Patent No.: US 12,412,388 B2
(45) Date of Patent: Sep. 9, 2025

(54) METHOD FOR DETERMINING REGION ATTRIBUTE INFORMATION, COMPUTING DEVICE, AND STORAGE MEDIUM

(71) Applicant: BEIJING BAIDU NETCOM SCIENCE TECHNOLOGY CO., LTD., Beijing (CN)

(72) Inventors: Yanyan Li, Beijing (CN); Jingbo Zhou, Beijing (CN); Jizhou Huang, Beijing (CN); Airong Jiang, Beijing (CN); Dejing Dou, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 394 days.

(21) Appl. No.: 17/945,979

(22) Filed: Sep. 15, 2022

(65) Prior Publication Data

US 2023/0013055 A1 Jan. 19, 2023

(30) Foreign Application Priority Data

Sep. 16, 2021 (CN) .......................... 202111089473.X (51) Int. Cl.
| | |
|---|---|
| *G06V 20/10* | (2022.01) |
| *G06T 7/12* | (2017.01) |
| *G06T 7/62* | (2017.01) |
| *G06T 7/73* | (2017.01) |
| *G06V 10/22* | (2022.01) |

(52) U.S. Cl.
CPC ................ *G06V 20/10* (2022.01); *G06T 7/12* (2017.01); *G06T 7/62* (2017.01); *G06T 7/73* (2017.01); *G06V 10/225* (2022.01); *G06T 2207/20021* (2013.01); *G06T 2207/30181* (2013.01)

(58) Field of Classification Search
None
See application file for complete search history.

(56) References Cited

U.S. PATENT DOCUMENTS

| | | | |
|---|---|---|---|
| 9,245,366 B1 * | 1/2016 | Magouyrk | ............. G06T 11/00 |
| 2007/0213929 A1 * | 9/2007 | Tanizaki | ................. G06F 16/29 |
| | | | 701/451 |

(Continued)

FOREIGN PATENT DOCUMENTS

| | | |
|---|---|---|
| CN | 103220479 A | 7/2013 |
| CN | 104103211 A | 10/2014 |

(Continued)

OTHER PUBLICATIONS

Xin, Haoran et al. "Out-of-Town Recommendation with Travel Intention Modeling." AAAI Conference on Artificial Intelligence (2021).*

(Continued)

*Primary Examiner* — Andrew W Bee
*Assistant Examiner* — Christine Zhao
(74) *Attorney, Agent, or Firm* — Seed IP Law Group LLP (57) ABSTRACT

A method is provided. The method includes: determining, by one or more computers, a name of a target region, wherein the name of the target region is determined based on geometry attribute information of the target region; and determining, by one or more computers, region attribute information of the target region based on the name of the target region.

10 Claims, 2 Drawing Sheets

Determining a name of a target region, wherein the name of the target region is determined based on geometry attribute information of the target region — S101

Determining region attribute information of the target region based on the name of the target region — S102

(56) References Cited

U.S. PATENT DOCUMENTS

| | | | | |
|---|---|---|---|---|
| 2012/0136724 | A1* | 5/2012 | McGuire | H04N 21/25883 |
| | | | | 705/14.58 |
| 2014/0074396 | A1 | 3/2014 | Bonnell et al. | |
| 2017/0068689 | A1* | 3/2017 | Sato | G06F 16/29 |

FOREIGN PATENT DOCUMENTS

| | | | | | |
|---|---|---|---|---|---|
| CN | 104252489 | A | * | 12/2014 | G06F 16/29 |
| CN | 106960029 | A | * | 7/2017 | G06F 16/29 |
| CN | 110020086 | A | | 7/2019 | |
| CN | 101324439 | A | * | 2/2020 | |
| CN | 110795642 | A | * | 2/2020 | G06F 16/9537 |
| CN | 111627058 | A | * | 9/2020 | G06T 7/62 |
| CN | 111695488 | A | | 9/2020 | |
| CN | 112966192 | A | | 6/2021 | |
| CN | 108805131 | B | | 8/2021 | |
| JP | 2006293664 | A | * | 10/2006 | G06F 16/29 |

OTHER PUBLICATIONS

Dai, Shaojie et al., "Personalized POI Recommendation: Spatio-Temporal Representation Learning with Social Tie", Department of Computer Science and Technology, Ocean University of China, Qingdao, China, 2021, pp. 558-574.

"The Morphological Model and Retrieving Algorithm of the POI Data", Science of Surveying and Mapping, vol. 43. No. 8, Aug. 2018, pp. 141-150.

Xin, Haoran et al., "Out-of-Town Recommendation with Travel Intention Modeling", University of Science and Technology of China, 2021, pp. 8.

\* cited by examiner

Fig. 5

METHOD FOR DETERMINING REGION ATTRIBUTE INFORMATION, COMPUTING DEVICE, AND STORAGE MEDIUM

CROSS REFERENCE TO RELATED APPLICATION

This application claims priority to Chinese patent application No. 202111089473.X filed on Sep. 16, 2021, the contents of which are hereby incorporated by reference in their entirety for all purposes.

TECHNICAL FIELD

The present disclosure relates to the field of geographic information system technologies, and in particular, to the field of map region naming technologies.

BACKGROUND

With the development of science and technology, many forms of maps such as an electronic map have emerged. As study subjects on maps, regions are divided based on roads in the real world or boundaries of points of interest (POI), or by taking natural objects, such as rivers, as boundaries.

SUMMARY

The present disclosure provides a method for determining region attribute information, a computing device, and a storage medium.

According to a first aspect of the present disclosure, a computer-implemented method is provided. The method includes: determining, by one or more computers, a name of a target region, wherein the name of the target region is determined based on geometry attribute information of the target region; and determining, by one or more computers, region attribute information of the target region based on the name of the target region.

According to a second aspect of the present disclosure, a computing device is provided. The computing device includes: one or more processors; and a memory storing one or more programs configured to be executed by the one or more processors, the one or more programs comprising instructions for performing operations comprising: determining a name of a target region, wherein the name of the target region is determined based on geometry attribute information of the target region; and determining region attribute information of the target region based on the name of the target region.

According to a third aspect of the present disclosure, a non-transitory computer-readable storage medium is provided. The non-transitory computer-readable storage medium storing one or more programs comprising instructions that, when executed by one or more processors of a computing device, cause the computing device to perform operations comprising: determining a name of a target region, wherein the name of the target region is determined based on geometry attribute information of the target region; and determining region attribute information of the target region based on the name of the target region.

It should be understood that the content described in this section is not intended to identify critical or important features of the embodiments of the present disclosure, and is not used to limit the scope of the present disclosure. Other features of the present disclosure will be easily understood through the following specification.

BRIEF DESCRIPTIONS OF THE DRAWINGS

The accompanying drawings are used to better understand the solutions, and do not constitute a limitation on the present disclosure. In the accompanying drawings.

DETAILED DESCRIPTION OF THE EMBODIMENTS

Embodiments of the present disclosure are described below in conjunction with the accompanying drawings, where various details of the embodiments of the present disclosure are included to facilitate understanding, and should only be considered as exemplary. Therefore, those of ordinary skill in the art should appreciate that various changes and modifications may be made to the embodiments described here without departing from the scope and spirit of the present disclosure. Likewise, for clarity and conciseness, description of well-known functions and structures is omitted in the following description.

Figure 1:
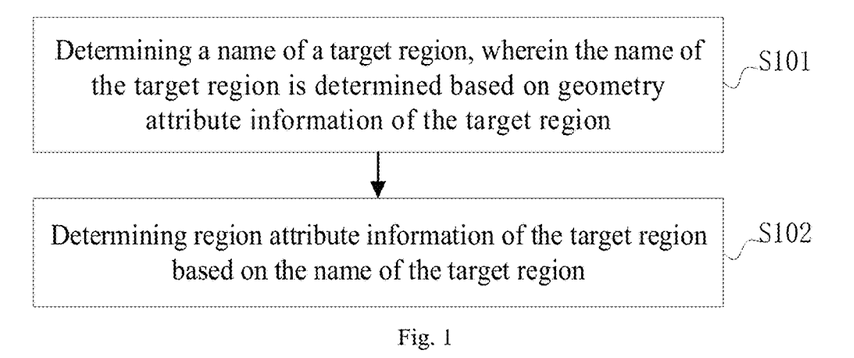
FIG. 1 is a schematic flowchart of a method for determining region attribute information according to some embodiments of the present disclosure.

FIG. 1 illustrates a method for determining region attribute information according to some embodiments of the present disclosure. As shown in FIG. 1, the method includes:

step S101 of determining a name of a target region, wherein the name of the target region is determined based on geometry attribute information of the target region; and step S102 of determining region attribute information of the target region based on the name of the target region.

Figure 2:
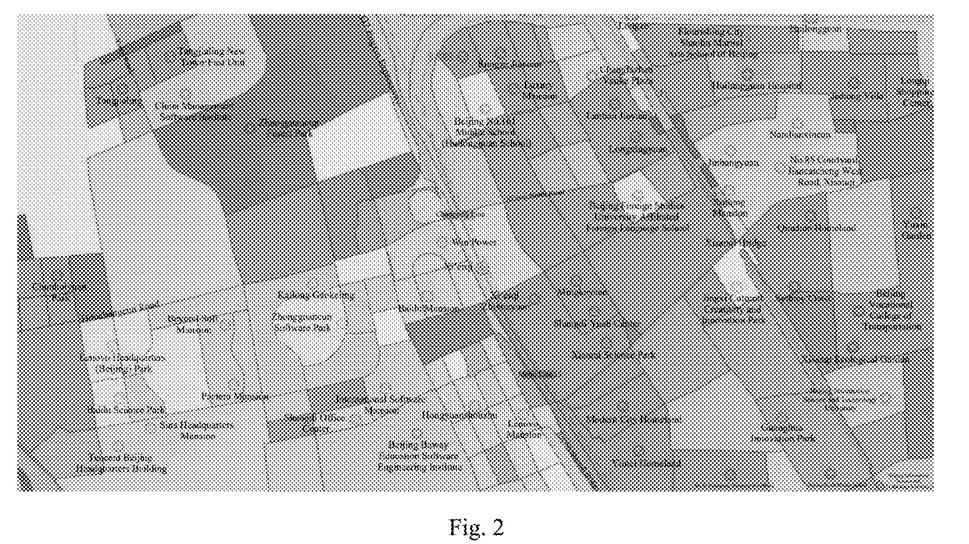
FIG. 2 is an example diagram of region division according to some embodiments of the present disclosure.

For example, regions are divided based on roads in the real world or boundaries of points of interest (POI), or by taking natural objects, such as rivers or mountains, as boundaries. For illustrative purposes only, example divided regions are shown in FIG. 2. A region ID or a name of a region is a unique index for the region, which is used to uniquely determine the region.

In some embodiments, the name of the target region may be determined based on the geometry attribute information of the target region, where the target region may be a regular region (for example, a rectangle), or may be an irregular region (for example, an irregular polygon). Depending on different target regions, the geometry attribute information may be a centroid, an area, a perimeter, a visual center point, etc. of the target region. Because the geometry attribute information of the target region is relatively stable and not prone to changes, the name of the target region that is obtained based on the geometry attribute information is also relatively stable.

In some embodiments, the region attribute information of the target region may be determined based on the name of the target region through a certain mapping relationship. Because the name determined based on the geometry attribute information of the target region is relatively stable, the region attribute information of the target region can be inherited.

Compared with the prior art in which region naming is performed by means of primary key increment, in the embodiments of the present disclosure, the name of the target region is determined based on the geometry attribute information of the target region; and the region attribute information of the target region is determined based on the name of the target region. As the geometry attribute information of the target region is relatively stable and not prone to changes, the attribute information of the target region is inherited, thereby avoiding the case in the prior art in which when a name of a target region is determined by means of primary key increment, if a primary key of a target region name changes (for example, when a corresponding region is deleted, a corresponding primary key of the target region also changes), attribute information of the target region cannot be inherited by a name of a changed target region.

In some embodiments, the geometry attribute information includes at least two of a visual center point of the target region, a first perimeter of the target region and a first area of the target region.

The visual center point represents a center point that is visually located in a maximum internally-included regular region of a polygonal region. The internally-included regular region may be an internally-included circle, an internally-included rectangle, an internally-included triangle, etc.

The name of the target region being determined based on at least two pieces of geometry attribute information can prevent inaccurate region attribute information from being inherited due to the determination of the name of the target region based on only one piece of geometry attribute information. In some embodiments, where the visual center of the target region has not changed and an area of the target region has changed, if the name is determined based on only the visual center, the name of the target region does not change, and inaccurate region attribute information may be inherited based on the name (because the area has changed, and the region attribute information of the region may change, resulting in inaccurate region attribute information being inherited); however, if the name of the region is determined based on the two pieces of geometry attribute information, namely, the visual center and the area, a change in either geometry attribute may bring a change in the name of the region, thereby preventing inaccurate region attribute information from being inherited.

In some embodiments, determining the region name of the target region includes:

determining the region name of the target region based on the visual center point of the target region and at least one of the first perimeter and the first area of the target region.

In some embodiments, because the visual center point of the target region and the first perimeter and the first area of the target region are usually fixed attribute information of the target region and generally do not change, the name of the target region that is determined based on the above information is also relatively stable, thereby also ensuring that attribute information of the target region can be inherited. In addition, it can also be ensured that accurate information is inherited.

Figure 3:
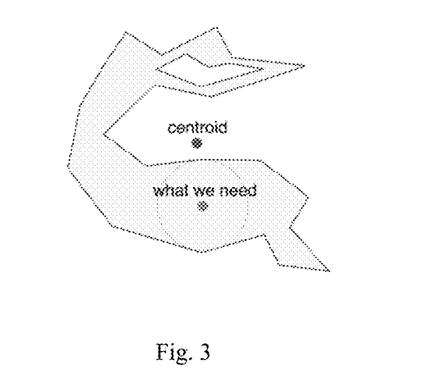
FIG. 3 is an example diagram of a visual center of a region according to some embodiments of the present disclosure.

In some embodiments, a point corresponding to a "centroid" in FIG. 3 is not a visual center point but a physical center point, and a point corresponding to "what we need" is a visual center point. In some embodiments, the use of the visual center point of the region, instead of a physical center point of the region avoids the problem that the physical center point does not belong to the target region (for example, when the target region is of an irregular shape, the physical center point may not be within the target region) and thus cannot represent the target region. It should be noted that the visual center point of the target region may overlap with the physical center point thereof. In some embodiments, when the target region is a rectangle or a circle, the visual center point overlaps with the physical center point. In some embodiments, the name of the target region is determined based on the visual center point, such that the problem that the physical center point is not within the target region and thus cannot represent the target region when the target region is an irregular region can be avoided.

However, in the prior art, region naming is usually performed by means of primary key increment. For example, a name of a region block 1 is 1, a name of a region block 2 is 2, and a name of a region block 3 is 3. When the region block 2 is incorporated into the region block 1, that is to say, there is a region upgrade, a name of a region incorporating the region block 1 and the region block 2 is 1, and information (for example, a region portrait) of the region block corresponding to the name "1" may have changed because of the region block with the name "1" after the incorporation, and if attribute information of the region is still determined based on the name 1, there may be a problem that wrong or inaccurate information is inherited; and the name of the region block 3 correspondingly changes to 2, and because the name has changed, an existing name cannot inherit attribute information corresponding to the original name 3. In examples of the present disclosure, the region name of the target region is determined based on the visual center point of the target region and at least one of the first perimeter and the first area of the target region, and since the visual center point and information about the first perimeter and the first area of the target region are stable, accurate region attribute information can be inherited.

Compared with the prior art in which region naming is performed by means of primary key increment, in the present disclosure, the name of the target region is determined based on the visual center point of the target region and at least one of the first perimeter and the first area of the target region; and the region attribute information of the target region is determined based on the name of the target region. In other words, the name of the target region is determined based on the visual center point of the target region and at least one of the first perimeter and the first area of the target region, such that upon determination of the attribute information of the target region based on the name of the target region that is determined according to this method, the name of the target region does not change provided that the visual center point of the target region and at least one of the first perimeter and the first area of the target region have not changed, and the attribute information of the target region is thus inherited and accurate attribute information is inherited, thereby avoiding the case in the prior art in which when a name of a target region is determined by means of primary key increment, if a primary key of a target name changes (for example, when a corresponding region is deleted, a corresponding primary key of the target region also changes), attribute information of the target region cannot be inherited by a name of a changed target region.

In some embodiments, the region attribute information includes region portrait information.

In some embodiments, the region attribute information may include an area, a population, traffic information, enterprises information, and other information of the region, or may be portrait information about the region that is obtained through analysis based on some basic information of the region.

It should be noted that related information in the present disclosure is legally obtained with no breach of user privacy.

In some embodiments of the present disclosure, the region attribute information includes the region portrait information, such that huge amounts of basic data information do not need to be analyzed again, that is, some basic data of the target region does not need to be obtained again for further data processing and analysis, thereby ensuring the efficiency of obtaining the region portrait information.

In some embodiments, the method further includes:

performing recommendation based on the determined region portrait information of the target region.

In some embodiments, videos, news, etc. may be pushed to a demographic of the target region based on the portrait information of the target region.

For this embodiment of the present disclosure, because this embodiment of the present disclosure enables the region attribute information to be inherited and accurate attribute information to be inherited, the accuracy of subsequent recommendation based on the region portrait of the target region is improved and ensured.

In some embodiments, determining the name of the target region based on the visual center point of the target region and at least one of the first perimeter and the first area of the target region includes:

determining a first grid code based on the visual center point of the target region, and determining a second grid code based on at least one of the first perimeter and the first area of the target region; and determining the name of the target region based on the first grid code and the second grid code.

In some embodiments, determining the name of the target region may involve two parts. One part is determining the first grid code based on the visual center point of the target region, and the other is determining the second grid code based on at least one of the first perimeter and the first area of the target region. The second grid code may be determined based on information about the first perimeter, may be determined based on the first area of the target region, or may be determined based on the information about the first perimeter and information about the first area.

In some embodiments, the determining a first grid code based on the visual center point of the target region includes:

determining Mercator coordinates based on coordinates of the visual center point of the target region; and determining the first grid code based on the determined Mercator coordinates by using a Geohash algorithm. In some embodiments, the visual center point of the target region is determined using a corresponding algorithm for determining a polygon visual center point, Mercator coordinates corresponding to the visual center point are obtained by using a corresponding coordinate conversion method, and then the first grid code is determined according to the Geohash algorithm. Geohash is a geocoding method, which can encode longitude and latitude data of a two-dimensional space into an alphabetic string.

The Geohash algorithm usually includes the following steps: first, converting a longitude and a latitude into binary; second, combining the longitude and the latitude, where the longitude is at an even position and the latitude is at an odd position, and it should be noted that 0 is also at an even digit; and third, performing encoding according to Base32.

In some embodiments, the determining a second grid code based on at least one of the first perimeter and the first area of the target region includes:

determining the second grid code based on a pre-determined second grid code determination rule, and at least one of the first perimeter and the first area of the target region.

In some embodiments, the first perimeter or the first area may be directly used as the second grid code, or the first perimeter and the first area may be combined to obtain the second grid code.

The second grid code may be of a pre-determined length. In some embodiments, if the code determined based on the first area is of a length less than the pre-determined length, zero-padding may be performed. If the code determined based on the first area is of a length greater than the pre-determined length, a modulo operation may be performed.

In some embodiments, the first perimeter and the first area are historical data of the target region, and the method further includes:

determining at least one of a second perimeter and a second area of the target region, wherein the second perimeter and the second area are latest data of the target region;

determining, based on the second perimeter and the first perimeter or the first area and the second area, whether a change in the perimeter or area of the target region exceeds a pre-determined threshold; and determining the second grid code based on at least one of the first perimeter and the first area if the change does not exceed the pre-determined threshold.

In some embodiments, at least one of the second perimeter and the second area of the target region may also be obtained, where the second perimeter and the second area are latest data of the target region; and then, it is determined whether the change in the perimeter or area of the target region exceeds the pre-determined threshold, and if the change exceeds the pre-determined threshold, the second grid code is determined based on the new second area and second perimeter, thereby preventing inaccurate region attribute information from being obtained based on an original name of the region. If the change does not exceed the pre-determined threshold, it indicates that the change is very small, and the region attribute information may not have changed. In this case, the previous name of the region may still be used, thereby avoiding changing the name of the region, thus resulting in a need to re-determine the attribute information of the target region, for example, the region portrait information.

In some embodiments, determining the visual center point of the target region includes:

obtaining a closed polygon representing the target region;

selecting a maximum available internally-included rectangle or circle from the closed polygon;

determining a geometric center point of the maximum available internally-included rectangle or circle; and determining the geometric center point as the visual center point of the target region.

In some embodiments, the closed polygon representing the target region is determined, in which specifically, the target region may be represented by a plurality of vertices of the polygon; and it is determined, through corresponding algorithm, that the maximum available internally-included rectangle or circle is selected from the closed polygon, and a geometric center point (such as a point of intersection of diagonal lines of the rectangle or a center of the circle) of the maximum available internally-included rectangle or circle is determined as the visual center point of the target region.

Figure 4:
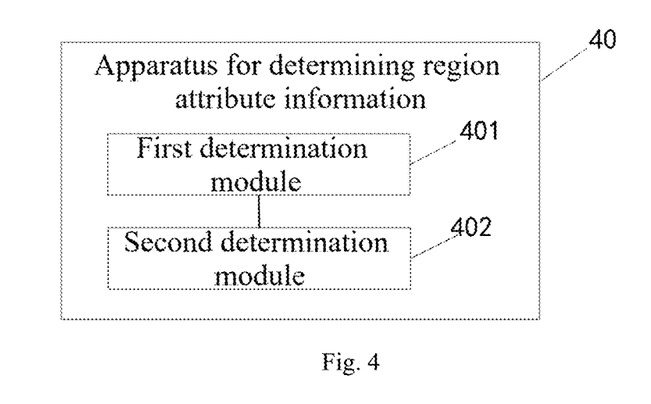
FIG. 4 is a schematic structural diagram of an apparatus for determining region attribute information according to some embodiments of the present disclosure.

In some embodiments, an apparatus for determining region attribute information is provided. As shown in FIG. 4, the apparatus includes:

a first determination module 401 configured to determine a name of a target region, where the name of the target region is determined based on geometry attribute information of the target region; and a second determination module 402 configured to determine region attribute information of the target region based on the name of the target region.

In some embodiments, the region attribute information includes region portrait information.

In some embodiments, the apparatus further includes:
a recommendation module configured to perform recommendation based on the determined region portrait information of the target region.

In some embodiments, the geometry attribute information includes at least two of a visual center point of the target region, a first perimeter of the target region, and a first area of the target region.

In some embodiments, the first determination module is configured to determine the name of the target region based on the visual center point of the target region and at least one of the first perimeter and the first area of the target region.

In some embodiments, the first determination module includes:

a first determination unit configured to determine a first grid code based on the visual center point of the target region, and determine a second grid code based on at least one of the first perimeter and the first area of the target region; and a second determination unit configured to determine the name of the target region based on the first grid code and the second grid code.

In some embodiments, the first determination unit is specifically configured to determine Mercator coordinates based on coordinates of the visual center point of the target region;

and determine the first grid code based on the determined Mercator coordinates by using a Geohash algorithm.

In some embodiments, the second determination unit is configured to determine the second grid code based on a pre-determined second grid code determination rule, and at least one of the first perimeter and the first area of the target region.

In some embodiments, the first perimeter and the first area are historical data of the target region, and the apparatus further includes:

a third determination module configured to determine at least one of a second perimeter and a second area of the target region, wherein the second perimeter and the second area are latest data of the target region;

a fourth determination module configured to determine, based on the second perimeter and the first perimeter or the first area and the second area, whether a change in the perimeter or area of the target region exceeds a pre-determined threshold; and a fifth determination module configured to determine the second grid code based on at least one of the first perimeter and the first area if the change does not exceed the pre-determined threshold.

In some embodiments, the visual center point represents a center point that is visually located in a maximum internally-included regular region of a polygonal region.

In some embodiments, the apparatus further includes:
an obtaining module configured to obtain a closed polygon representing the target region;

a selection module configured to select a maximum available internally-included rectangle or circle from the closed polygon;

a sixth determination module configured to determine a geometric center point of the maximum available internally-included rectangle or circle; and a seventh determination module configured to determine the geometric center point as the visual center point of the target region.

For this embodiment of the present disclosure, beneficial effects achieved thereby are the same as those in the above method embodiment, and will not be repeated here.

In the technical solutions of the present disclosure, obtaining, storage, application, etc. of personal information of a user all comply with relevant laws and regulations and are not against public order and good customs.

According to some embodiments of the present disclosure, the present disclosure further provides an computing device, a readable storage medium, and a computer program product.

In some embodiments, the computing device includes: at least one processor; and a memory communicatively connected to the at least one processor, where the memory stores instructions executable by the at least one processor, and when executed by the at least one processor, the instructions cause the at least one processor to perform the method according to the embodiments of the present disclosure.

Compared with the prior art in which region naming is performed by means of primary key increment, in the computing device of the present disclosure, the name of the target region is determined based on the geometry attribute information of the target region; and the region attribute information of the target region is determined based on the name of the target region. In other words, the name of the target region is determined based on the geometry attribute information of the target region, such that upon determination of attribute information of the target region based on the name of the target region that is determined according to this method, since the geometry attribute information of the target region is relatively stable and not prone to changes, the attribute information of the target region is inherited, thereby avoiding the case in the prior art in which when a name of a target region is determined by means of primary key increment, if a primary key of a target region name changes (for example, when a corresponding region is deleted, a corresponding primary key of the target region also changes), attribute information of the target region cannot be inherited by a name of a changed target region.

In some embodiments, the readable storage medium is a non-transitory computer-readable storage medium storing computer instructions, where the computer instructions are used to cause a computer to perform the method according to the embodiments of the present disclosure.

Compared with the prior art in which region naming is performed by means of primary key increment, in the readable storage medium of the present disclosure, the name of the target region is determined based on the geometry attribute information of the target region; and the region attribute information of the target region is determined based on the name of the target region. In other words, the name of the target region is determined based on the geometry attribute information of the target region, such that upon determination of attribute information of the target region based on the name of the target region that is determined according to this method, since the geometry attribute information of the target region is relatively stable and not prone to changes, the attribute information of the target region is inherited, thereby avoiding the case in the prior art in which when a name of a target region is determined by means of primary key increment, if a primary key of a target region name changes (for example, when a corresponding region is deleted, a corresponding primary key of the target region also changes), attribute information of the target region cannot be inherited by a name of a changed target region.

The computer program product includes a computer program, where when the computer program is executed by a processor, the method according to the first aspect of the present disclosure is implemented.

Compared with the prior art in which region naming is performed by means of primary key increment, in the computer program product of the present disclosure, the name of the target region is determined based on the geometry attribute information of the target region; and the region attribute information of the target region is determined based on the name of the target region. In other words, the name of the target region is determined based on the geometry attribute information of the target region, such that upon determination of attribute information of the target region based on the name of the target region that is determined according to this method, since the geometry attribute information of the target region is relatively stable and not prone to changes, the attribute information of the target region is inherited, thereby avoiding the case in the prior art in which when a name of a target region is determined by means of primary key increment, if a primary key of a target region name changes (for example, when a corresponding region is deleted, a corresponding primary key of the target region also changes), attribute information of the target region cannot be inherited by a name of a changed target region.

Figure 5:
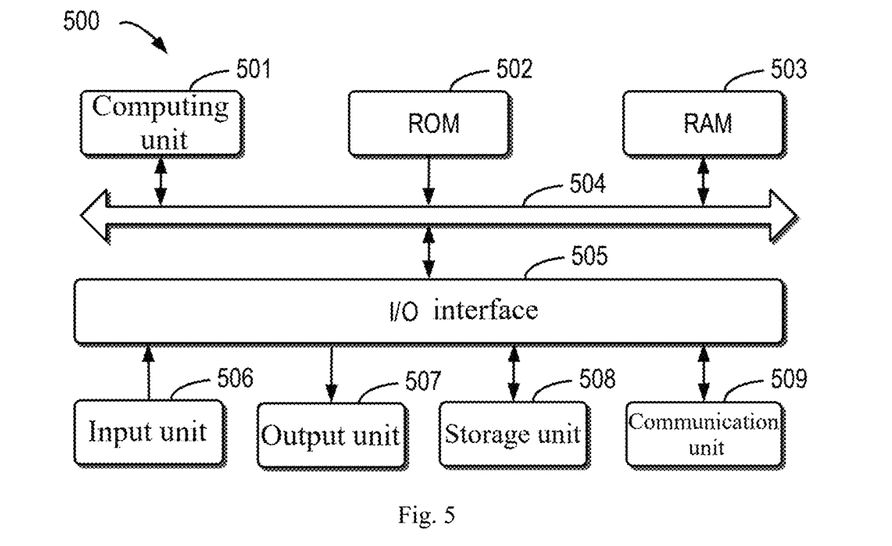
FIG. 5 is a block diagram of a computing device capable of implementing a plurality of embodiments of the present disclosure.

FIG. 5 is a schematic block diagram of an example computing device 500 that may be used to implement the embodiments of the present disclosure. The computing device is intended to represent various forms of digital computers, such as a laptop computer, a desktop computer, a workstation, a personal digital assistant, a server, a blade server, a mainframe computer, and other suitable computers. The computing device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 5, the device 500 includes a computing unit 501, which may perform various appropriate actions and processing according to a computer program stored in a read-only memory (ROM) 502 or a computer program loaded from a storage unit 508 to a random access memory (RAM) 503. The RAM 503 may further store various programs and data required for the operation of the device 500. The computing unit 501, the ROM 502, and the RAM 503 are connected to each other through a bus 504. An input/output (I/O) interface 505 is also connected to the bus 504.

A plurality of components in the device 500 are connected to the I/O interface 505, including: an input unit 506, such as a keyboard or a mouse; an output unit 507, such as various types of displays or speakers; a storage unit 508, such as a magnetic disk or an optical disc; and a communication unit 509, such as a network interface card, a modem, or a wireless communication transceiver. The communication unit 509 allows the device 500 to exchange information/data with other devices through a computer network, such as the Internet, and/or various telecommunications networks.

The computing unit 501 may be various general-purpose and/or dedicated processing components with processing and computing capabilities. Some examples of the computing unit 501 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 501 performs various methods and processing described above, for example, the method for determining region attribute information. For example, in some embodiments, the method for determining region attribute information may be implemented as a computer software program, which is tangibly contained in a machine-readable medium, for example, the storage unit 508. In some embodiments, a part or all of the computer program may be loaded and/or installed onto the device 500 via the ROM 502 and/or the communication unit 509. When the computer program is loaded onto the RAM 503 and executed by the computing unit 501, one or more steps of the method for determining region attribute information described above may be performed. Alternatively, in other embodiments, the computing unit 501 may be configured, by any other suitable means (for example, by means of firmware), to perform the method for determining region attribute information.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: the systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

A program code used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or liquid crystal display (LCD) monitor) configured to display information to the user; and a keyboard and pointing apparatus (for example, a mouse or a trackball) through which the user may provide an input to the computer. Other types of apparatuses can also be used to provide interaction with the user. For example, a feedback provided to the user may be any form of sensory feedback (for example, a visual feedback, an auditory feedback, or a tactile feedback); and an input from the user may be received in any form (including acoustic input, voice input, or tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure can be performed in parallel, in order, or in a different order, provided that the desired result of the technical solutions disclosed in the present disclosure can be achieved, which is not limited herein.

The specific implementations above do not constitute a limitation on the protection scope of the present disclosure. Those skilled in the art should understand that various modifications, combinations, sub-combinations, and replacements can be made based on design requirements and other factors. Any modifications, equivalent replacements, improvements, etc. within the spirit and principle of the present disclosure shall fall within the protection scope of the present disclosure.

What is claimed is:

1. A computer-implemented method, comprising:
   determining, by one or more computers, a name of a target region, based on a geometry attribute of the target region, wherein the target region is delineated based on roads or boundaries of points of interest (POI) in a real world, or by taking natural objects in the real world as boundaries, wherein the geometry attribute comprises a centroid of the target region, wherein the geometry attribute further comprises at least two of a visual center point of the target region, a first perimeter of the target region, and a first area of the target region, wherein the name of the target region comprises a first grid code and a second grid code, wherein the first grid code is determined based on the visual center point of the target region, and wherein the second grid code is determined based on at least one of the first perimeter and the first area of the target region;
   determining, by one or more computers, region attribute information of the target region based on the name of the target region, wherein the region attribute information includes region portrait information obtained based on basic information of the target region, and wherein the basic information includes an area, a population, traffic information and enterprises information; and
   performing recommendation based on the region portrait information of the target region, comprising:
   pushing, based on the region portrait information of the target region, videos and news to a client of a demographic of the target region.

2. The method according to claim 1, wherein the determining the first grid code based on the visual center point of the target region comprises:
   determining Mercator coordinates based on coordinates of the visual center point of the target region; and
   determining the first grid code based on the Mercator coordinates by using a Geohash algorithm.

3. The method according to claim 1, wherein the determining the second grid code based on at least one of the first perimeter and the first area of the target region comprises:
   determining the second grid code based on a second grid code determination rule, and at least one of the first perimeter and the first area of the target region.

4. The method according to claim 1, wherein the first perimeter and the first area are historical data of the target region, and the method further comprises:
   determining at least one of a second perimeter and a second area of the target region,
   wherein the second perimeter and the second area are latest data of the target region;
   determining, based on the second perimeter and the first perimeter, or the first area and the second area, whether a change in perimeter or area of the target region exceeds a threshold; and
   determining a second grid code based on at least one of the first perimeter and the first area if the change does not exceed the pre-determined threshold.

5. The method according to claim 1, wherein the visual center point represents a center point that is visually located in a maximum internally-included regular region of a polygonal region.

6. The method according to claim 1, wherein determining the visual center point of the target region comprises:

obtaining a closed polygon representing the target region;

selecting a maximum available internally-included rectangle or circle from the closed polygon;

determining a geometric center point of the maximum available internally-included rectangle or circle; and determining the geometric center point as the visual center point of the target region.

7. A computing device, comprising:

one or more processors; and a memory storing one or more programs configured to be executed by the one or more processors, the one or more programs comprising instructions for performing operations comprising:

determining a name of a target region based on a geometry attribute of the target region, wherein the target region is delineated based on roads or boundaries of points of interest (POI) in a real world, or by taking natural objects in the real world as boundaries, wherein the geometry attribute comprises a centroid of the target region, wherein the geometry attribute further comprises at least two of a visual center point of the target region, a first perimeter of the target region, and a first area of the target region, wherein the name of the target region comprises a first grid code and a second grid code, wherein the first grid code is determined based on the visual center point of the target region, and wherein the second grid code is determined based on at least one of the first perimeter and the first area of the target region;

determining region attribute information of the target region based on the name of the target region, wherein the region attribute information includes region portrait information obtained based on basic information of the target region, and wherein the basic information includes an area, a population, traffic information and enterprises information; and performing recommendation based on the region portrait information of the target region, comprising:

pushing, based on the region portrait information of the target region, videos and news to a client of a demographic of the target region.

8. The computing device according to claim 7, wherein the determining the first grid code based on the visual center point of the target region comprises:

determining Mercator coordinates based on coordinates of the visual center point of the target region; and determining the first grid code based on the Mercator coordinates by using a Geohash algorithm.

9. The computing device according to claim 7, wherein the determining the second grid code based on at least one of the first perimeter and the first area of the target region comprises:

determining the second grid code based on a second grid code determination rule, and at least one of the first perimeter and the first area of the target region.

10. A non-transitory computer-readable storage medium storing one or more programs comprising instructions that, when executed by one or more processors of a computing device, cause the computing device to perform operations comprising:

determining a name of a target region based on a geometry attribute of the target region, wherein the target region is delineated based on roads or boundaries of points of interest (POI) in a real world, or by taking natural objects in the real world as boundaries, wherein the geometry attribute comprises a centroid of the target region, wherein the geometry attribute further comprises at least two of a visual center point of the target region, a first perimeter of the target region, and a first area of the target region, wherein the name of the target region comprises a first grid code and a second grid code, wherein the first grid code is determined based on the visual center point of the target region, and wherein the second grid code is determined based on at least one of the first perimeter and the first area of the target region;

determining region attribute information of the target region based on the name of the target region, wherein the region attribute information includes region portrait information obtained based on basic information of the target region, and wherein the basic information includes an area, a population, traffic information and enterprises information; and performing recommendation based on the region portrait information of the target region, comprising:

pushing, based on the region portrait information of the target region, videos and news to a client of a demographic of the target region.

* * * * *